United States Patent Office 2,722,506
Patented Nov. 1, 1955

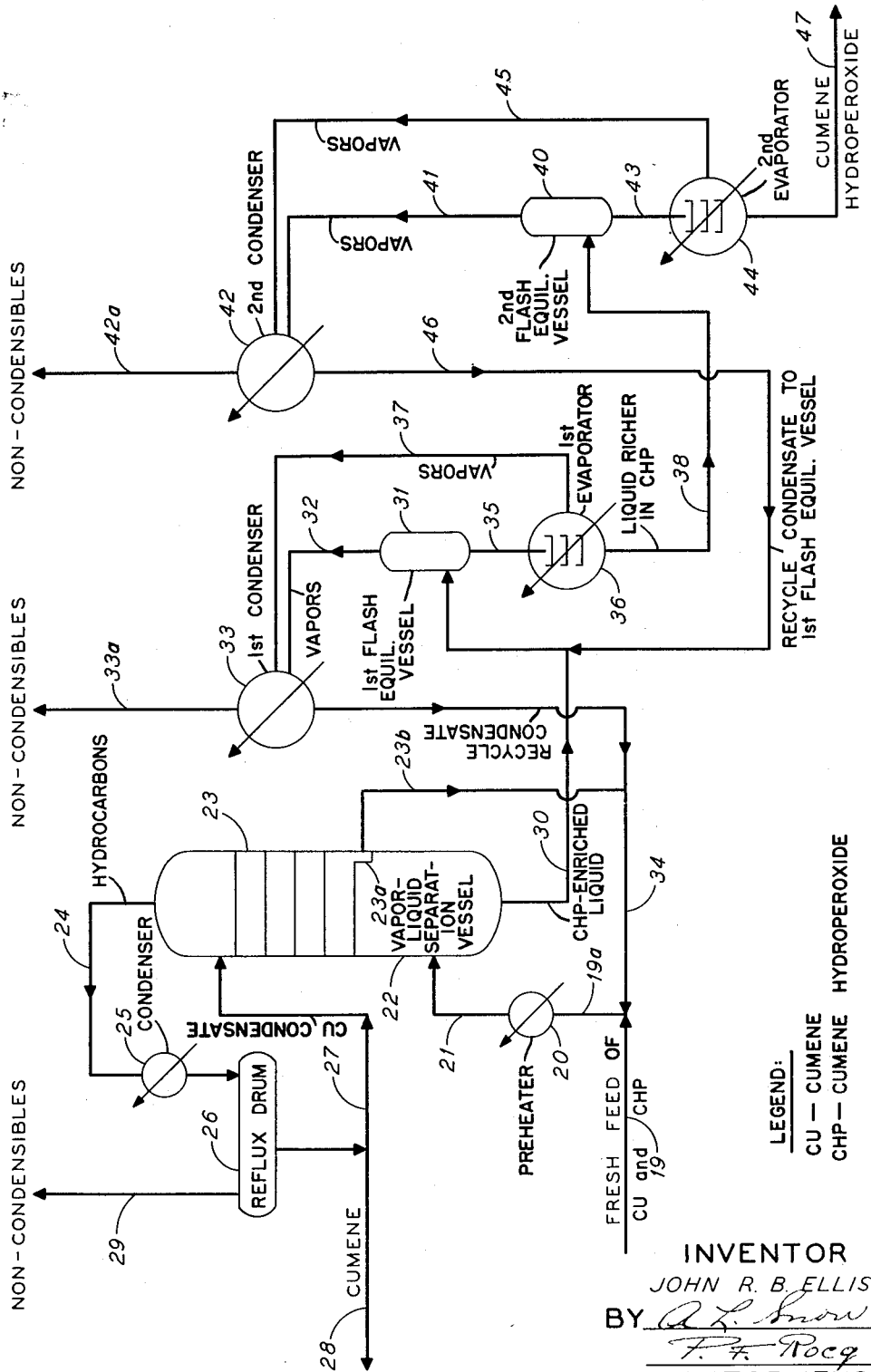

2,722,506

SEPARATION OF CUMENE OR CYMENE FROM ITS RESPECTIVE HYDROPEROXIDE BY DISTILLATION

John R. B. Ellis, near San Rafael, Calif., assignor to California Research Corporation, San Francisco, Calif., a corporation of Delaware Application May 20, 1952, Serial No. 288,843

12 Claims. (Cl. 202—52)

This invention relates to a process for concentrating temperature-sensitive organic materials present in solution in temperature-stable, lower-boiling organic materials. More particularly, it relates to a process for concentrating cumene hydroperoxide present in solution in cumene.

Solutions of cumene hydroperoxide in cumene can be obtained in accordance with procedures based on the research work of Hock and Lang, described in Berichte, 1944, vol. 77, pages 257 to 264, by oxidizing cumene in liquid phase with molecular oxygen to produce a reaction product mixture containing a minor proportion of cumene hydroperoxide and a major proportion of unreacted cumene. The separation of cumene hydroperoxide from unreacted cumene in these mixtures or solutions by conventional distillation techniques presents a difficult problem, owing to the fact that higher-boiling cumene hydroperoxide decomposes at temperatures well below the boiling point of cumene.

It has now been found that cumene hydroperoxide present in a mixture with, or a solution in, cumene, can be concentrated by subjecting such a mixture or solution to a succession of flash evaporations at progressively reduced pressures without exceeding the maximum temperature at which the temperature-sensitive cumene hydroperoxide can exist without significant decomposition.

The maximum temperature at which cumene hydroperoxide can be kept for an appreciable time without excessive decomposition is about 240° F. Therefore, during the separation of cumene from cumene hydroperoxide, the temperature is held in the range from about 190 to about 220° F. and preferably from about 205 to about 215° F. Because an unduly long residence of the feed mixture in the separation system for concentrating cumene hydroperoxide results in an excessive decomposition of cumene hydroperoxide, the "hold-up" or residence time of cumene hydroperoxide in the system is kept at a minimum consistent with an efficient operation. Thus, for an operating temperature of about 212° F. in a three-stage system, a residence time not greater than 15 minutes will furnish satisfactory results. Mixtures of cumene hydroperoxide and cumene which contain from 25 to 30% by weight of hydroperoxide, when processed in accordance with the invention in a three-stage system yield concentrates having very low cumene contents, e. g., 1.5% by weight or lower.

The process of the invention may be better understood by reference to the appended drawing which is a diagrammatic illustration of apparatus and a flow pattern suitable for its practice. For the sake of simplicity, various pieces of auxiliary equipment including pumps, valves, and the like, are omitted from the drawing.

In the drawing a liquid feed mixture of cumene hydroperoxide and cumene containing approximately 20–30% by weight of cumene hydroperoxide is fed through lines 19 and 19–a to a heating zone 20. The heated mixture is passed through line 21 into a vapor-liquid separation zone 22 operated at a temperature in the range from about 190 to about 220° F., and preferably from 205 to 215° F. and at a pressure in the range from about 70 to about 120 mm. and preferably from 80 to 100 mm. The upper portion of vapor-liquid separation zone 22 contains a rectifying section 23 where the vapors rising from zone 22 are rectified by passage through a series of bubble-cap plates.

When the heated feed mixture is introduced into vapor-liquid separation zone 22, phase separation takes place, and vapors containing the major proportion of cumene rise to rectifying section 23. This section contains a suitable number of plates or trays to insure that the vapors leaving the top tray are essentially free of cumene hydroperoxide. In passing through the rectification section vapor-phase cumene separates from the higher-boiling cumene hydroperoxide which condenses and flows down through weir section 23–a into line 23–b and thence into line 34 to be combined with the fresh incoming feed in line 19–a. Cumene vapors leave the vapor-liquid separation zone through line 24 and are condensed by indirect heat exchange in condenser 25. The condensate which is cumene essentially free of cumene hydroperoxide passes into reflux drum 26 from which part of it is pumped out of the system through line 28 and part is returned through line 27 to section 23 as reflux. Reflux drum 26 is operated at a pressure sufficiently low to insure a pressure about 85 mm. in vapor-liquid separation zone 22, usually at about 50 mm. Non-condensible gases taken overhead with cumene from section 23 are withdrawn through line 29.

Cumene hydroperoxide-enriched liquid is withdrawn from the bottom of vapor-liquid separation zone 22 at the bottom temperature through line 30 and fed into a first equilibrium flashing zone 31, which is an open drum operated at a pressure lower than that of zone 22, in the range from about 20 to about 80 mm., and preferably in the range from 25 to 40 mm. Vapors flashed from the liquid in drum 31 pass through line 32 into condensation zone 33. The liquid phase from equilibrium flashing zone 31 which is approximately in equilibrium with the vapor in that zone at the prevailing pressure is passed through line 35 into evaporation zone 36 maintained at a temperature in the range of 190 to 220° F., and preferably of 205 to 215° F. Evaporation zone 36 is operated at a pressure less than that of the vapor-liquid separation zone 22 and in the range from about 20 to about 80 mm., preferably in the range from 25 to 40 mm. The vapors produced in evaporation zone 36 are passed through line 37 into condensation zone 33 where they combine with the vapors entering through line 32 from equilibrium flashing zone 31 and are condensed.

The condensate formed in condensation zone 33 is returned to vapor-liquid separation zone 22 via lines 34, 19–a and 21. Condensation zone 33, equilibrium flashing zone 31 and evaporation zone 36 are all interconnected and all operate under reduced pressure. Sufficient vacuum is applied at condensation zone 33 to maintain pressures of about 32 mm. in communicating zones 31 and 36.

Liquid is withdrawn from the bottom of evaporation zone 36 at bottom temperature and passed through line 38 into a second equilibrium flashing zone 40 maintained at a pressure lower than that in first equilibrium flashing zone and in the range from about 5 to about 20 mm., and preferably in the range from 5 to 15 mm. In equilibrium flashing zones 31 and 40 vapors are flashed from the liquid, and a vapor-liquid equilibrium is established at the temperature and pressure of these zones. When the liquid from these zones is passed into evaporation zones 36 and 44, respectively, an even and orderly distribution of the liquid over the evaporative surface is readily obtained. Vapors flashed from the liquid in zone 40 pass through line 41 to a second condensation zone 42. Liquid from zone 40 approximately in equilibrium with the vapors at the prevailing pressure is passed through line 43 into a second evaporation zone 44 maintained at a temperature in the range from about 190 to about 220° F., and preferably from 205 to 215° F., and at a pressure in the range from about 5 to about 20 mm., preferably from 5 to 15 mm. The vapors formed in evaporation zone 44 pass through line 45 into condensation zone 42 where they are combined and condensed with the vapors entering zone 42 through line 41. The condensate from condensation zone 42 is withdrawn through line 46 and recycled to equilibrium flashing zone 31. Non-condensible constituents are withdrawn from condensation zone 42 through line 42–a. The liquid non-evaporated constituents remaining in evaporation zone 44 is the final concentrate of cumene hydroperoxide and is withdrawn through line 47. The final concentrate is essentially free of cumene, having a cumene content of about 1.2% by weight or lower; its cumene hydroperoxide content is usually about 90% by weight, the remaining 10% being heavy side-reaction products formed during the oxidation of cumene.

The temperatures and pressures set out hereinabove are quite critical to production of a cumene hydroperoxide concentrate essentially free of cumene. The bulk liquid in zones 22, 36 and 44 should not be held at temperatures above 220° F. in the interest of safe operation and high cumene hydroperoxide yield. Pressures must be within the broader ranges set out hereinbefore, if efficient separation is to be achieved, and it is highly desirable to operate within the preferred ranges.

The following typical example illustrates the operation of the process above described: A liquid feed of cumene hydroperoxide and cumene containing 25% by weight of cumene hydroperoxide, 70% by weight of cumene, the remainder to make 100% by weight being organic compounds formed by side reactions in the air oxidation of cumene, was fed at a temperature of 212° F. into the vapor-liquid separation zone provided with a rectifying section at the top thereof and operated at a bottoms pressure of about 85 mm. Hg. As a result of the rectification of the vaporized portion of this feed, cumene was removed overhead and collected in the receiver drum operated under a vacuum of 50 mm. and at a temperature of about 85° F. The reflux ratio in the rectifying section was about 0.2. Cumene, which was recovered from the reflux drum, contained only 0.6% by weight of cumene hydroperoxide.

The cumene hydroperoxide taken from the bottom of the vapor-liquid separation zone had the following composition:

| | Percent by weight |
|---|---|
| Cumene | 38 |
| Cumene hydroperoxide | 55 |
| Balance organic side-reaction products | 7 |

In the next stage, the first equilibrium flashing zone was maintained at a pressure of about 32 mm., and the first evaporator was operated at a temperature of 212° F. and 32 mm. pressure. In the final stage, the second equilibrium flashing zone was operated at a pressure of about 12 mm., while the second evaporator was maintained at a temperature of 212° F. and 12 mm. pressure.

The ultimate concentrate of cumene hydroperoxide recovered from the second evaporator, upon analysis, was found to contain only 1.2% of cumene, the remainder being cumene hydroperoxide and heavy oxidation side-reaction products.

While the foregoing process of this invention has been described with particular reference to the separation of cumene from cumene hydroperoxide, concentration of cymene hydroperoxides present in mixtures with cymenes can be effected in the same general manner by adjusting temperatures and pressures. Cumene hydroperoxide and cymene hydroperoxide are quite similar with respect to temperature-stability, so that the maximum temperature limits are the same. Because of the lower volatility of the cymenes, the operation should be carried out in the lower portion of the pressure ranges set out hereinbefore to achieve good separation.

If a somewhat greater cumene content in the final concentrate can be tolerated, the concentration can be effected in two stages. In the foregoing example the cumene content of the liquid effluent from the first evaporation zone 36 is about 7% by weight. By operating vapor-liquid separation zone 22, followed by a simple flash equilibrium zone, in the lower portion of the specified pressure ranges, i. e., below about 100 mm. and below about 50 mm., respectively, and preferably in the ranges of 60 to 100 mm., and 10 to 20 mm., a cumene content of less than about 5% by weight can be achieved in two stages.

In the aforedescribed arrangement for the operation of the invention, it is possible to send the feed solution by gravity from zone 22 to zone 31 and from zone 36 to zone 40 by appropriate location of the equipment, thereby eliminating the cost of installing and maintaining pumps. The condensation of vapors in the system is obtained with the aid of conventional equipment such as cooling water coils or other adequate cooling means, while the evaporation of the liquid is secured by employing heating elements in the trays of a conventional evaporator, or a similarly effective evaporation means.

I claim:

1. A process for separating cumene from cumene hydroperoxide which comprises passing a feed mixture of cumene and cumene hydroperoxide into a vapor-liquid separation zone having a rectification section in the upper portion thereof; maintaining a pressure below about 100 mm. and a temperature in the range from 190 to 220° F. in the lower portion of the vapor-liquid separation zone; withdrawing a cumene-rich vapor stream from the upper portion of said vapor-liquid separation zone; withdrawing a liquid stream comprising cumene and cumene hydroperoxide from the lower portion of said rectification section and returning said stream to said vapor-liquid separation zone together with fresh feed of cumene and cumene hydroperoxide; withdrawing a liquid stream richer in cumene hydroperoxide than said fresh feed from the lower portion of said vapor-liquid separation zone; passing this cumene-rich stream at approximately the temperature at the bottom of said vapor-liquid separation zone into an equilibrium flashing zone maintained at a pressure lower than that of said vapor-liquid separation zone and below 50 mm.; withdrawing a vapor stream rich in cumene from the upper portion of said equilibrium flashing zone and passing it into a condensation zone; withdrawing a liquid stream rich in cumene hydroperoxide from the lower portion of said equilibrium flashing zone and passing it into an evaporation zone maintained at a pressure approximately equal to that of said equilibrium flashing zone and at a temperature in the range from 190 to 220° F.; withdrawing a vapor stream rich in cumene from said evaporation zone and passing it into said condensation zone; returning the condensate from said condensation zone to said vapor-liquid separation zone together with the fresh feed and withdrawing a liquid stream rich in cumene hydroperoxide from the lower portion of said evaporation zone.

2. A process as defined in claim 1, in which the pressure in the lower portion of said vapor-liquid separation zone ranges from 60 to 100 mm., and the pressure in said equilibrium flashing zone and in said evaporation zone ranges from about 10 to about 20 mm.

3. A process for separating cumene from cumene hydroperoxide, which comprises passing a feed mixture of cumene and cumene hydroperoxide into a vapor-liquid separation zone having a rectification section in the upper portion thereof; maintaining a pressure in the range from 70 to 120 mm. and a temperature in the range from 190 to 220° F. in the lower portion of the vapor-liquid separation zone; passing a cumene-rich vapor stream from the vapor-liquid separation zone into the rectification section thereof; withdrawing a cumene-vapor stream essentially free of cumene hydroperoxide from the upper portion of the rectification section; withdrawing a liquid stream comprising cumene and cumene hydroperoxide from the lower portion of said rectification section and returning said stream to the vapor-liquid separation zone together with fresh feed; withdrawing a liquid stream richer in cumene hydroperoxide than said fresh feed from the lower portion of said vapor-liquid separation zone; passing this latter stream at approximately the temperature at the bottom of the vapor-liquid separation zone into a first equilibrium flashing zone maintained at a pressure substantially lower than that of said vapor-liquid separation zone; withdrawing a vapor stream rich in cumene from the upper portion of said first equilibrium flashing zone and passing it into a first condensation zone; withdrawing a liquid stream rich in cumene hydroperoxide from the lower portion of the first equilibrium flashing zone and passing it into a first evaporation zone maintained at a pressure approximately equal to that in the first equilibrium flashing zone and at a temperature in the range from 190 to 220° F.; withdrawing a vapor stream rich in cumene from said first evaporation zone and passing it into said first condensation zone; returning the condensate from said first condensation zone to said vapor-liquid separation zone together with the fresh feed; withdrawing a liquid stream rich in cumene hydroperoxide from the lower portion of said first evaporation zone and passing it into a second equilibrium flashing zone maintained at a pressure substantially lower than that of said first equilibrium flashing zone; withdrawing a vapor stream rich in cumene from the upper portion of said second equilibrium flashing zone and passing it into a second condensation zone; withdrawing a liquid stream further enriched in cumene hydroperoxide from the lower portion of said second equilibrium flashing zone and passing it into a second evaporation zone maintained at a pressure approximately equal to that of the second equilibrium flashing zone and at a temperature in the range from 190 to 220° F.; withdrawing a vapor stream from the upper portion of said second evaporation zone and passing it into said second condensation zone; returning the condensate from said second condensation zone to said first equilibrium flashing zone; and withdrawing a liquid cumene hydroperoxide concentrate from the lower portion of said second evaporation zone.

4. A process for separating cumene from cumene hydroperoxide, which comprises passing a feed mixture of cumene and cumene hydroperoxide into a vapor-liquid separation zone having a rectification section in the upper portion thereof; maintaining a pressure in the range from 70 to 120 mm. and a temperature in the range from 190 to 220° F. in the lower portion of the vapor-liquid separation zone; passing a cumene-rich vapor stream from the vapor-liquid separation zone into the rectification section thereof; withdrawing a cumene-vapor stream essentially free of cumene hydroperoxide from the upper portion of the rectification section; withdrawing a liquid stream comprising cumene and cumene hydroperoxide from the lower portion of said rectification section and returning said stream to the vapor-liquid separation zone together with fresh feed; withdrawing a liquid stream richer in cumene hydroperoxide than said fresh feed from the lower portion of said vapor-liquid separation zone; passing this latter stream at approximately the temperature at the bottom of the vapor-liquid separation zone into a first equilibrium flashing zone maintained at a pressure lower than that of said vapor-liquid separation zone and in the range from 20 to 80 mm.; withdrawing a vapor stream rich in cumene from the upper portion of said first equilibrium flashing zone and passing it into a first condensation zone; withdrawing a liquid stream rich in cumene hydroperoxide from the lower portion of the first equilibrium flashing zone and passing it into a first evaporation zone maintained at a pressure in the range from 20 to 80 mm. and a temperature in the range from 190 to 220° F.; withdrawing a vapor stream rich in cumene from said first evaporation zone and passing it into said first condensation zone; returning the condensate from said first condensation zone to said vapor-liquid separation zone together with the fresh feed; withdrawing a liquid stream rich in cumene hydroperoxide from the lower portion of said first evaporation zone and passing it into a second equilibrium flashing zone maintained at a pressure lower than that of said first equilibrium flashing zone and in the range from 5 to 20 mm.; withdrawing a vapor stream rich in cumene from the upper portion of said second equilibrium flashing zone and passing it into a second condensation zone; withdrawing a liquid stream further enriched in cumene hydroperoxide from the lower portion of said second equilibrium flashing zone and passing it into a second evaporation zone maintained at a pressure in the range from 5 to 20 mm. and at a temperature in the range from 190 to 220° F.; withdrawing a vapor stream from the upper portion of said second evaporation zone and passing it into said second condensation zone; returning the condensate from said second condensation zone to said first equilibrium flashing zone; and withdrawing a liquid cumene hydroperoxide concentrate from the lower portion of said second evaporation zone.

5. A process for separating cumene from cumene hydroperoxide, which comprises passing a feed mixture of cumene and cumene hydroperoxide into a vapor-liquid separation zone having a rectification section in the upper portion thereof; maintaining a pressure in the range from 80 to 100 mm. and a temperature in the range from 205 to 215° F. in the lower portion of the vapor-liquid separation zone; passing a cumene-rich vapor stream from the vapor-liquid separation zone into the rectification section thereof; withdrawing a cumene-vapor stream essentially free of cumene hydroperoxide from the upper portion of the rectification section; withdrawing a liquid stream comprising cumene and cumene hydroperoxide from the lower portion of said rectification section and returning said stream to the vapor-liquid separation zone together with fresh feed; withdrawing a liquid stream richer in cumene hydroperoxide than the fresh feed from the lower portion of said vapor-liquid separation zone; passing this latter stream at approximately the temperature at the bottom of said vapor-liquid separation zone into a first equilibrium flashing zone maintained at a pressure lower than that of said vapor-liquid separation zone and in the range from 25 to 40 mm.; withdrawing a vapor stream rich in cumene from the upper portion of said first equilibrium flashing zone and passing it into a first condensation zone; withdrawing a liquid stream rich in cumene hydroperoxide from the lower portion of the first equilibrium flashing zone and passing it into a first evaporation zone maintained at a pressure in the range from 25 to 40 mm. and a temperature in the range from 205 to 215° F.; withdrawing a vapor stream rich in cumene from said first evaporation zone and passing it into said first condensation zone; returning the condensate from said first condensation zone to said vapor-liquid separation zone together with the fresh feed; withdrawing a liquid stream rich in cumene hydroperoxide from the lower portion of said first evaporation zone and passing it into a second equilibrium flashing zone maintained at a pressure lower than that of said first equilibrium flashing zone and in the range from 5 to 15 mm.; withdrawing a vapor stream rich in cumene from the upper portion of said second equilibrium flashing zone and passing it into a second condensation zone; withdrawing a liquid stream further enriched in cumene hydroperoxide from the lower portion of said second equilibrium flashing zone and passing it into a second evaporation zone maintained at a pressure in the range from 5 to 15 mm. and at a temperature in the range from 205 to 215° F.; withdrawing a vapor stream from the upper portion of said second evaporation zone and passing it into said second condensation zone; returning the condensate from said second condensation zone to said first equilibrium flashing zone; and withdrawing a liquid cumene hydroperoxide concentrate from the lower portion of said second evaporation zone.

6. In a process for separating cumene from cumene hydroperoxide, the combination of steps comprising introducing a liquid stream rich in cumene hydroperoxide at a temperature in the range from 190 to 220° F. into an equilibrium flashing zone maintained at a pressure in the range from 5 to 20 mm.; withdrawing a vapor stream rich in cumene from the upper portion of said equilibrium flashing zone and passing it into a condensation zone, withdrawing a liquid stream enriched in cumene hydroperoxide from the lower portion of said equilibrium flashing zone and passing it into an evaporation zone maintained at a pressure in the range from 5 to 20 mm. and at a temperature in the range from 190 to 220° F.; withdrawing a vapor stream rich in cumene from the upper portion of said evaporation zone and passing it into said condensation zone; withdrawing the condensate from said condensation zone; and withdrawing a liquid cumene hydroperoxide concentrate substantially free of cumene from the lower portion of said evaporation zone.

7. A process for separating the hydroperoxide of an aromatic hydrocarbon of the group consisting of cumene and cymene from a mixture of a minor proportion of said hydroperoxide and a major proportion of its corresponding aromatic hydrocarbon, which comprises introducing a liquid stream of said mixture at a temperature in the range from 190 to 220° F. and under a pressure of less than 100 mm. into a first equilibrium flashing zone maintained at a lower pressure from 20 to 80 mm.; withdrawing a vapor stream rich in aromatic hydrocarbon from the upper portion of said first equilibrium flashing zone and passing it into a first condensation zone; withdrawing a liquid stream which is richer in hydroperoxide than the original feed mixture from the lower portion of said first equilibrium flashing zone and passing it to a first evaporation zone maintained at a pressure approximately equal to that of said first equilibrium flashing zone and at a temperature in the range from 190 to 220° F.; withdrawing a vapor stream rich in aromatic hydrocarbon from said first evaporation zone and passing it into said first condensation zone; withdrawing the condensate from said first condensation zone from the system; withdrawing from the lower portion of said first evaporation zone a liquid stream, richer in hydroperoxide than the liquid stream passed into said first evaporation zone, and introducing it into a second equilibrium flashing zone maintained at a pressure lower than that of said first equilibrium flashing zone and in the range from 5 to 20 mm.; withdrawing a vapor stream rich in aromatic hydrocarbon from the upper portion of said second equilibrium flashing zone and passing it into a second condensation zone; withdrawing a liquid stream further enriched in hydroperoxide from the lower portion of said second equilibrium flashing zone and passing it into a second evaporation zone maintained at a pressure approximately equal to that of said second equilibrium flashing zone and at a temperature in the range from 190 to 220° F.; withdrawing a vapor stream from the upper portion of said second evaporation zone and passing it into said second condensation zone; recycling the condensate from said second condensation zone to the first equilibrium flashing zone; and withdrawing a liquid, predominantly hydroperoxide concentrate from the lower portion of said second evaporation zone.

8. A process for separating cymene hydroperoxide from a mixture of a minor proportion of cymene hydroperoxide and a major proportion of cymene, which comprises introducing a liquid stream of said mixture at a temperature in the range from 190 to 220° F. and under a pressure of less than 100 mm. into a first equilibrium flashing zone maintained at a lower pressure from 20 to 80 mm.; withdrawing a vapor stream rich in cymene from the upper portion of said first equilibrium flashing zone and passing it into a first condensation zone; withdrawing a liquid stream which is richer in cymene hydroperoxide than the original feed mixture from the lower portion of said first equilibrium flashing zone and passing it to a first evaporation zone maintained at a pressure approximately equal to that of said first equilibrium flashing zone and at a temperature in the range from 190 to 220° F.; withdrawing a vapor stream rich in cymene from said first evaporation zone and passing it into said first condensation zone; withdrawing the condensate from said first condensation zone from the system; withdrawing from the lower portion of said first evaporation zone a liquid stream, richer in cymene hydroperoxide than the liquid stream passed into said first evaporation zone, and introducing it into a second equilibrium flashing zone maintained at a pressure lower than that of said first equilibrium flashing zone and in the range from 5 to 20 mm.; withdrawing a vapor stream rich in cymene from the upper portion of said second equilibrium flashing zone and passing it into a second condensation zone; withdrawing a liquid stream further enriched in cymene hydroperoxide from the lower portion of said second equilibrium flashing zone and passing it into a second evaporation zone maintained at a pressure approximately equal to that of said second equilibrium flashing zone and at a temperature in the range from 190 to 220° F.; withdrawing a vapor stream from the upper portion of said second evaporation zone and passing it into said second condensation zone; recycling the condensate from said second condensation zone to the first equilibrium flashing zone; and withdrawing a liquid, predominantly cymene hydroperoxide concentrate from the lower portion of said second evaporation zone.

9. A process for separating cumene hydroperoxide from a mixture of a minor proportion of cumene hydroperoxide and a major proportion of cumene, which comprises introducing a liquid stream of said mixture at a temperature in the range from 190 to 220° F. and under a pressure of less than 100 mm. into a first equilibrium flashing zone maintained at a lower pressure from 20 to 80 mm.; withdrawing a vapor stream rich in cumene from the upper portion of said first equilibrium flashing zone and passing it into a first condensation zone; withdrawing a liquid stream which is richer in cumene hydroperoxide than the original feed mixture from the lower portion of said first equilibrium flashing zone and passing it to a first evaporation zone maintained at a pressure approximately equal to that of said first equilibrium flashing zone and at a temperature in the range from 190 to 220° F.; withdrawing a vapor stream rich in cumene from said first evaporation zone and passing it into said first condensation zone; withdrawing the condensate from said first condensation zone from the system; withdrawing from the lower portion of said first evaporation zone a liquid stream, richer in cumene hydroperoxide than the liquid stream passed into said first evaporation zone, and introducing it into a second equilibrium flashing zone maintained at a pressure lower than that of said first equilibrium flashing zone and in the range from 5 to 20 mm.; withdrawing a vapor stream rich in cumene from the upper portion of said second equilibrium flashing zone and passing it into a second condensation zone; withdrawing a liquid stream further enriched in cumene hydroperoxide from the lower portion of said second equilibrium flashing zone and passing it into a second evaporation zone maintained at a pressure approximately equal to that of said second equilibrium flashing zone and at a temperature in the range from 190 to 220° F.; withdrawing a vapor stream from the upper portion of said second evaporation zone and passing it into said second condensation zone; recycling the condensate from said second condensation zone to the first equilibrium flashing zone; and withdrawing a liquid, predominantly cumene hydroperoxide concentrate from the lower portion of said second evaporation zone.

10. A process for separating the hydroperoxide of an aromatic hydrocarbon of the group consisting of cumene and cymene from a mixture of a minor proportion of said hydroperoxide and a major proportion of its corresponding aromatic hydrocarbon, which comprises introducing a liquid stream of said mixture at a temperature in the range from 190 to 220° F. and under a pressure of less than 100 mm. into an equilibrium flashing zone maintained at a lower pressure than that of the incoming feed stream; withdrawing a vapor stream rich in aromatic hydrocarbon from the upper portion of said equilibrium flashing zone and passing it into a condensation zone; withdrawing a liquid stream rich in hydroperoxide from the lower portion of said equilibrium flashing zone and passing it into an evaporation zone maintained at a pressure approximately equal to that of said equilibrium flashing zone and at a temperature in the range from 190 to 220° F.; withdrawing a vapor stream rich in aromatic hydrocarbon from said evaporation zone and passing it into said condensation zone; withdrawing the condensate from said condensation zone; and withdrawing a liquid stream rich in hydroperoxide from the lower portion of said evaporation zone.

11. A process for separating cymene hydroperoxide from a mixture of a minor proportion of said cymene hydroperoxide and a major proportion of cymene, which comprises introducing a liquid stream of said mixture at a temperature in the range from 190 to 220° F. and under a pressure of less than 100 mm. into an equilibrium flashing zone maintained at a lower pressure than that of the incoming feed stream; withdrawing a vapor stream rich in cymene from the upper portion of said equilibrium flashing zone and passing it into a condensation zone; withdrawing a liquid stream rich in cymene hydroperoxide from the lower portion of said equilibrium flashing zone and passing it into an evaporation zone maintained at a pressure approximately equal to that of said equilibrium flashing zone and at a temperature in the range from 190 to 220° F.; withdrawing a vapor stream rich in cymene from said evaporation zone and passing it into said condensation zone; withdrawing the condensate from said condensation zone; and withdrawing a liquid stream rich in cymene hydroperoxide from the lower portion of said evaporation zone.

12. A process for separating cumene hydroperoxide from a mixture of a minor proportion of said cumene hydroperoxide and a major proportion of cumene, which comprises introducing a liquid stream of said mixture at a temperature in the range from 190 to 220° F. and under a pressure of less than 100 mm. into an equilibrium flashing zone maintained at a lower pressure than that of the incoming feed stream; withdrawing a vapor stream rich in cumene from the upper portion of said equilibrium flashing zone and passing it into a condensation zone; withdrawing a liquid stream rich in cumene hydroperoxide from the lower portion of said equilibrium flashing zone and passing it into an evaporation zone maintained at a pressure approximately equal to that of said equilibrium flashing zone and at a temperature in the range from 190 to 220° F.; withdrawing a vapor stream rich in cumene from said evaporation zone and passing it into said condensation zone; withdrawing the condensate from said condensation zone; and withdrawing a liquid rich in cumene hydroperoxide from the lower portion of said evaporation zone.

References Cited in the file of this patent

UNITED STATES PATENTS

| | | |
|---|---|---|
| 2,274,802 | Mills | Mar. 3, 1942 |
| 2,425,661 | Weber et al. | Aug. 12, 1947 |
| 2,467,769 | Morrow | Apr. 19, 1949 |
| 2,527,640 | Lorand et al. | Oct. 31, 1950 |
| 2,547,938 | Hall et al. | Apr. 10, 1951 |
| 2,548,435 | Lorand et al. | Apr. 10, 1951 |